June 14, 1960  G. W. BAKER  2,940,229
DECAPPING CONTAINERS
Filed Nov. 10, 1958  5 Sheets-Sheet 1

INVENTOR.
Gerald W. Baker
BY Green, McCallister & Miller
HIS ATTORNEYS

G. W. BAKER 2,940,229

DECAPPING CONTAINERS

Filed Nov. 10, 1958

INVENTOR.
Gerald W. Baker
BY *Green, McCallister & Miller*
HIS ATTORNEYS

Fig. 13

United States Patent Office 2,940,229
Patented June 14, 1960

2,940,229

DECAPPING CONTAINERS

Gerald W. Baker, Muncie, Ind., assignor to Ball Brothers Company, Incorporated, Muncie, Ind., a corporation of Indiana Filed Nov. 10, 1958, Ser. No. 772,739

19 Claims. (Cl. 53—3)

This invention relates to removing closure elements from containers and to a decapping machine for removing temporary closures covering open top end portions of containers.

In the glass container industry, newly formed containers are not always immediately shipped directly to customers for filling, but may be stored in a warehouse before being shipped. Since a newly formed glass container is, in effect, sterilized during its manufacture, it is expedient to seal-off the container so as to maintain the interior thereof in a sterile condition. When this expedient is accomplished, the customer need not first sterilize the container before filling, but may proceed directly to a filling operation, thereby eliminating the expense of an additional sterilization.

To maintain the interior of a new container in a sterilized condition, it is sealed-off with a cap or top closure immediately after its formation. When the sealed-off container arrives at a customer's plant, the customer does not have to process the container through an expensive sterilization procedure, but need only remove the closure.

I have devised procedure and apparatus for automatically removing these temporary closures from the containers when they are to be filled with fluid material. The apparatus is adapted to be positioned adjacent a moving conveyor, such as a continuous conveyor, upon which the containers are placed for progressive advancement. An adjustable support is removably secured to a conveyor support and maintains a horizontally adjustable platform in a pre-determined vertical position above the conveyor. A motor is mounted on the platform and has a rotating disc assembly secured to its drive shaft. The rotating disc assembly has an annular resilient portion adjacent its outer circumference. The adjustable support positions the disc assembly at a pre-determined height, so that the resilient portion will contact an edge of the closure member on each container, as the container is moved past the disc by the moving conveyor.

A star wheel is secured to a side of the conveyor opposite the side to which the adjustable support is secured, so as to position the edge of the closure on each container in abutting contact with the resilient portion of the rotating disc. A collector chute is mounted adjacent the outer face of the rotating disc and receives the closure as it is removed from the container. A compressed air supply line may be employed to direct the closure into the collector chute, after the closure has been removed from the container by being spun up and off of the container through the action of the rotating disc. An outwardly-projecting frusto-conical deflecting surface mounted on the rotating disc concentrically of the resilient portion deflects the removed cap into the collector chute.

An object of my invention has been to devise new and improved procedure for removing caps from containers and to apparatus for carrying out the procedure in accordance with my conception;

Another object of my invention has been to provide an automatic decapping apparatus for removing closures from containers as they are continuously moved past a station on a moving conveyor;

An additional object of my invention has been to provide decapping apparatus which may easily be adjusted to accommodate the removal of closures from various sized and shaped containers;

A further object of my invention has been to provide a resiliently mounted star wheel assembly adapted to accurately urge and position closure members on various shaped containers against a rotating disc so that the closure member may be removed;

A still further object has been to provide a horizontally-adjustable motor mounting assembly adapted to accurately adjust linear and arcuate horizontal positions of a rotating disc secured to the drive shaft of a motor mounted thereon, and to adjust the camber of the disc, so that a closure member positioned on a container passing thereby may be quickly removed;

A further object of my invention has been to provide a rotating disc assembly which removes a closure member from a container by a frictional rotating action thereagainst, and which directs the removed closure toward a collecting chute;

These and other objects of my invention will be apparent to those skilled in the art from the following description and drawings in which.

Figure 1:
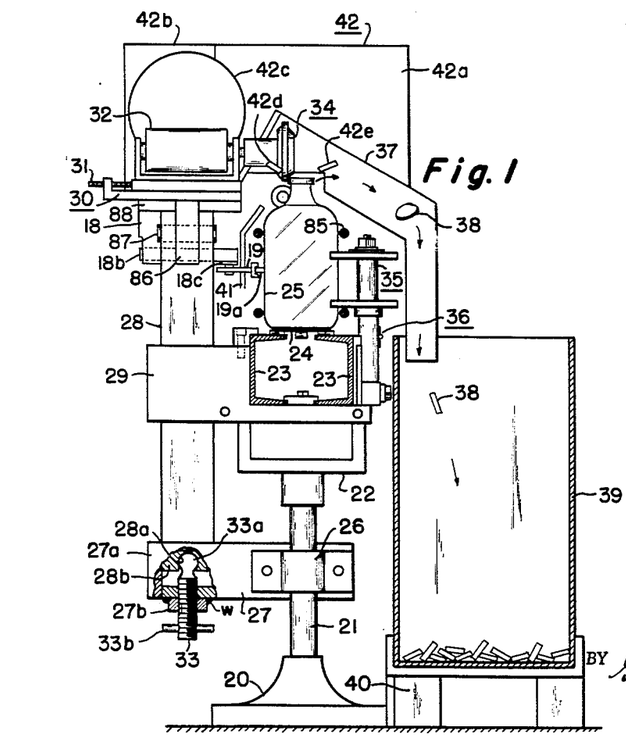
Figure 1 is a somewhat schematic side elevational view of an apparatus embodiment of my invention shown in a mounted position adjacent a moving conveyor.

Referring particularly to the schematic layout of Figure 1, a conveyor support base 20 retains a conveyor support post 21 in an upright position. A conveyor support bracket 22 is mounted on the support post 21. A pair of channel-shaped conveyor guide channels 23 are secured to the support brackets 22. A continuous belt conveyor 24 is shown guided longitudinally across the top of the guide channels 23 by means of center support roller 24a and side roller 24b (see Figure 4). The conveyor 24 is adapted to receive a plurality of containers 25 in an upright position for longitudinal movement therealong. As illustrated in Figure 1, the container 25 may, for example, be a glass jar or bottle.

A clamp 26 secures a horizontally-extending support member 27 to the conveyor support tube or post 21. An upright tube 28 is positioned for vertical movement within the bore of a housing end portion 27a of the horizontal bracket 27. The tube 28 may be moved vertically for adjustment purposes by means of a vertical adjustment screw 33 that is operably positioned within the housing 27a. The adjustment screw is provided with a ball head 33a at its upper end to be received in a socket 28a formed in a solid bottom end portion 28b of tube 28. The adjustment screw 33 is threaded into a nut 27b that is welded at w to horizontal bracket 27. A wing or handle 33b is provided through the screw 33 for adjusting its position within nut 27b. A vertically-split U-shaped guide brace or guide 29 is secured to the guide channels 23 to slidably retain the upright support post 28 in a vertical position. The vertically-split U-shaped guide brace, in effect, is formed by two L-shaped brackets, each having one leg secured to a portion of one of the guide channels 23 by means of vertically-adjustable locking block 29a (see Figure 4). The other legs terminate in a spacial relationship from one another, adjacent the back of the support tube 28. The blocks 29a have horizontally-extending flanges 29b which overlie an upper portion of the channels 23. A clamp screw 29c adjustably secures each block to the brace 29. A portion of the guide brace 29 passes beneath the channels 23 and is clamped thereto by means of a flanged plate 29d which overlaps bottom portions of the channels and is bolted to the guide. The plate 29d prevents the channels from being bent inwardly.

An adjustable motor mounting assembly 30 is secured to and mounted on the top of the upright supporting post or tube 28 (see Figure 1). A horizontal adjusting ball screw 31 extends backwardly from the adjustable motor mounting assembly 30 and is adapted to impart horizontal adjustment to a portion of the mounting assembly. A motor 32 is positioned on the horizontally adjustable portion of the mounting assembly 30.

A rotating disc assembly 34 is shown mounted on the drive shaft of the motor 32. A vertically-projecting star wheel assembly 35 is secured to a bracket 63 (Figure 4) that is fixed to a guide channel 23, and has a plurality of vertically spaced-apart idler star wheels rotatably secured thereto. The star wheels are rotated along a side of the upright containers 25 as the containers are moved at the station represented thereby on the conveyor 24. The star wheel assembly 35 contacts each container and holds a cap, lid or closure element 38 carried by an upper open end portion thereof in operable engagement with the rotating disc assembly 34. The star wheel assembly 35 is mounted on the channel 23 with a spring tensioned hinged joint 36, so that the assembly may be resiliently flexed to accommodate bottles 25 having various side walls.

A collector chute 37 is operatively mounted on the motor mounting assembly by brackets 105 (see also Figure 9), adjacent the front of the rotating disc assembly to guide and collect closure cover or cap elements 38 as they are removed from the container 25 by action of the rotating disc assembly 34. The caps are collected in a cap-receiving box 39 (see Figure 1) which is mounted on a palate 40 for easy removal and replacement thereof when the box becomes full.

An air line 41 (see Figure 1) for delivering compressed air from a suitable source (not shown) is positioned adjacent the bottom of the rotating disc assembly to assist and direct each removed cap element 38 into the collector chute 37. A signaling or indicator device 42c such as a horn, is mounted on a portion of an electrical box assembly 42 comprising a photo-cell cabinet area 42a, and an electrical wiring area 42b. The indicator device 42c is operatively connected to sound a warning if a closure element is not removed from a container after it has moved past the rotating disc assembly. The warning is actuated by an impulse from the photo-cell device, caused when an uncapped container interrupts the beam between photo-cell light source 42d and photo-cell eye 42e.

Figure 2:
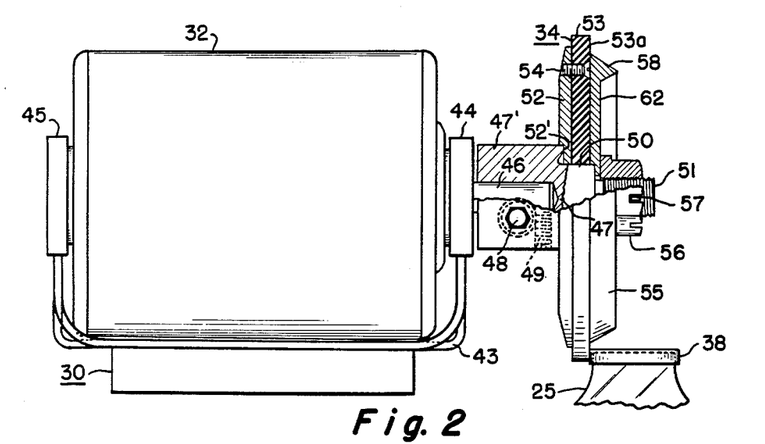
Figure 2 is an enlarged detail side elevational view partially in section of a rotating disc assembly mounted on a drive shaft of a motor as shown in Figure 1.

Referring now to the detailed view shown in Figure 2, the motor 32 is held in position on the adjustable motor mounting assembly 30 by means of a spring-tensioned retaining clamp 43. The clamp 43 has a front catch bracket 44 and a rear catch bracket 45 which bear resiliently against the front and rear, respectively, of the motor 32, and concentrically of its drive shaft 46. The drive shaft 46 has a collar 47 secured thereto by means of a tightening bolt 48 and a set screw 49 which prevents relative rotation therebetween. The collar 47 is provided with a smoothly surfaced disc mounting hub 50 of a lesser diameter than a rearward portion 47' of the collar. The disc mounting hub 50 has a threaded forwardly projecting stub end portion 51 of lesser diameter than the hub.

A center bored back disc 52 is mounted on the hub 50 and has a counter bore 52' which receives the nose of the rearward portion 47' of the collar 47. A centrally-bored, resilient contact disc 53 of rubber or other suitable material, is mounted on the hub 50 and secured to the back disc 52 by means of counter sunk screws 54. An outer disc-shaped plate 55 having a central bore 60 and a counter bore 59 (see Figure 3), is mounted on the hub 50, so that the nose of the hub projects into the counter bore 59. A retaining nut 56 is threaded over the threaded forward stud portion 51 of the collar 47, and abuts against a recessed front surface portion 62 of the plate 55 to hold the plate in abutting contact with the disc 53. A cotter pin 57 is slid through a slot in the nose of the nut and passed through the threaded stud portion 51 to retain the nut 56 thereon.

Figure 3:
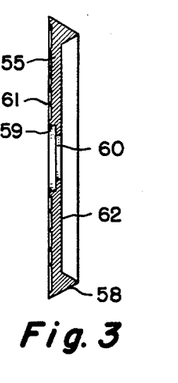
Figure 3 is a detailed cross-sectional view in elevation of the outer deflecting plate shown in Figure 2.

As is noted in both Figures 2 and 3, the plate 55 is provided with a horizontally-forwardly-projecting frustro-conical deflecting face 58. The angle which this deflecting face makes with the operating surface 53a of the contact disc 53 is important, since it controls the deflection of the cap element after its removal and directs the cap outwardly away from the moving disc and toward the collecting chute 37. I have obtained satisfactory results by utilizing an angle of approximately 120 degrees between the frustro-conical deflecting surface 58 and the operating surface 53a of the disc 53.

The distance from the top of the bottle and the surface of the deflecting face is also important and should be carefully controlled to obtain optimum operable results. If the top of the bottle is too close to the deflecting face 58, the cap element 38 will not clear the face upon removal, and if the distance is too far, the surface will be completely ineffective. I have found that optimum results are obtained when the distance between the top of of the bottle and the deflecting face 58 is at least the height of the cap.

As shown in Figure 3, the outer plate 55 is provided with a plurality of knife-like annular projections 61 protruding from its back surface. These projections 61 imbed themselves within the front surface of the disc 53 when the nut 56 has been tightened, and therefore, the discs 52, 53, and 55 all rotate simultaneously with one another, without slippage therebetween.

Figures 4, 5, 6:
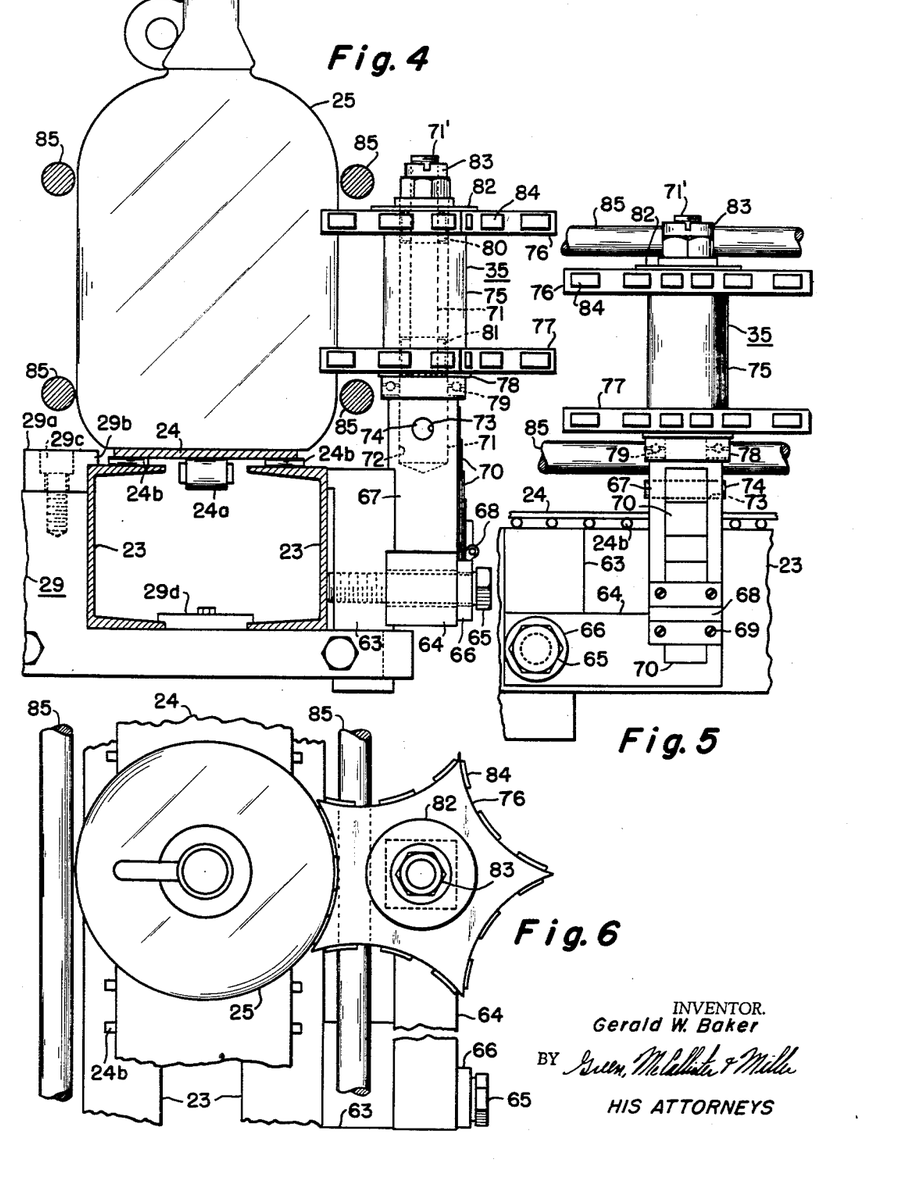
Figure 4 is a side elevational view of a star wheel assembly mounted on a conveyor support.
Figure 5 is an end view of a spring-mounted hinged joint shown in Figure 4.
Figure 6 is a plan view of a sprocket wheel assembly shown in Figure 4 with the mounting brackets omitted for the sake of simplicity.
Figure 7:
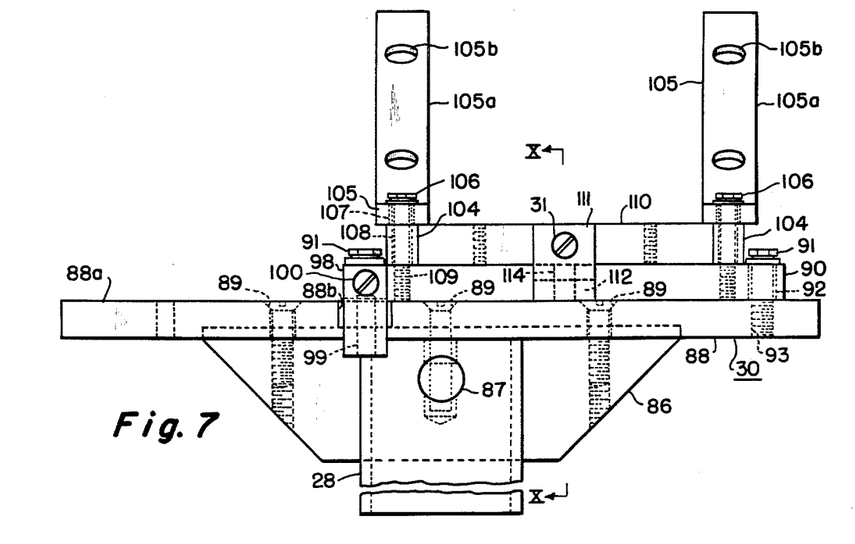
Figure 7 is an enlarged end elevational view of a motor mounting assembly shown in Figure 1.

Referring now to the sprocket wheel assembly, as shown in Figures 4, 5 and 6, a vertical mounting bracket 63 is secured adjacent guide channels 23 by means of guide brace 29. Horizontally-extending bracket 64 is secured to the vertical bracket 63 by means of a bolt 65 passing therethrough. A firm rubber mounting washer 66 is positioned between the head of the bolt and the horizontal bracket 64. An axle housing and support member 67 is secured to the horizontal bracket 64 by means of hinge 68 which is secured to the axle housing 67 and horizontal bracket 64 by set screws 69 (see Figure 5). A plurality of spring leaves 70 are compressibly retained against a back side of the housing 67 and the bracket 64 by the hinge 68. The joint formed between the housing 67 and the bracket 64 is therefore a spring-tensioned hinged joint, wherein the leaf springs normally retain the axle housing in a vertical position. This spring-tensioned hinged joint permits the entire star wheel assembly to flexibly move inwardly and outwardly as required to suit the individual positioning of each container 25, and therefore, accommodates any variances in the size or shape of the containers.

A vertically-extending axle 71 having a threaded portion 71' at its upper end, is retained and housed at its lower end in a recess or bore 72 formed in the upper end of the axle housing and support member 67. A cross pin 74 passes through a transverse bore 73 in the housing 67 and through a complementary bore in the axle 71 to removably retain the axle in a non-rotatable position within the housing. As noted in Figure 4, the lower ends of both the axle 71 and recess 72 may be of complementary conical shape.

An upper spindle 75 is rotatively mounted on the axle 71. The spindle carries an upper star wheel 76 and a lower star wheel 77. An end thrust bearing housing 78 is positioned between the lower star wheel 77 and the top of the housing 67. Bearing housing 78 contains a plurality of thrust bearings 79 which permit free rotation of the spindle 75. Needle bearings 80 and 81 are also provided for the upper and lower star wheels 76 and 77, respectively. The upper star wheel 76 has a collar 82 secured thereto. Retaining nut 83 is positioned on the threaded portion 71' to retain the spindle 75 and star wheels 76 and 77 on the axle 71.

As noted in Figure 6, each of the star wheels is provided with a plurality of soft, pliable, resilient fingers 84. The fingers 84 may be made of rubber, sponge rubber, or any other suitable material. These fingers 84 are imbedded in each segment of the star wheel and serve to resiliently grip the surfaces of the containers 25 in a gentle manner and eliminate scratches and other surface defects which would be formed on the outer surface of the containers 25, if they were exposed to direct contact with the hard-surfaced star wheels. In addition, the rubber fingers eliminate a chattering action between the container and the star wheel which would otherwise be present if the fingers were not used.

As each container 25 is moved along by conveyor 24, it contacts an arcuate segment of the star wheels and rotates the star wheel, so that the container is positioned within an arcuate segment, as shown in Figure 6. The rubber fingers 84 resiliently urge the top or upper end portion of the container towards the rotating operating surface 53a so that its closure element 38 is in abutment therewith for removal. A pair of guide rods or rails 85 are mounted longitudinally of the conveyor 24 and on each side thereof to further guide the containers 25 as they pass along the station provided by my decapping apparatus or machine.

Referring now to the adjustable motor mounting assembly 30, as shown in Figures 7 through 10, a horizontal support bar 86 is positioned within a slot 86' formed across the upright supporting post or tube 28, adjacent its upper end. The horizontal support bar 86 is retained in a stationary relationship with the supporting post 28 by means of a lock pin 87 which is passed through complementary bores within the support bar and supporting post.

A base member 88 is secured to the top of the horizontal support bar 86 by means of counter-sunk screws 89. The base member 88 has an outwardly-extending surface 88a for mounting a signaling device and other instruments thereon. A recess 88b is formed in an upper surface adjacent the back end of the base member. An intermediate member 90 is adjustably secured to the base member 88 by means of bolts 91 positioned through enlarged slots 92 formed within the member 90. The bolts are threaded into threaded bores 93 formed within the base member 88. When the bolts 91 are loosened, the slots 92 permit the intermediate member 90 to be adjusted in both transverse and arcuate directions.

Figure 8:
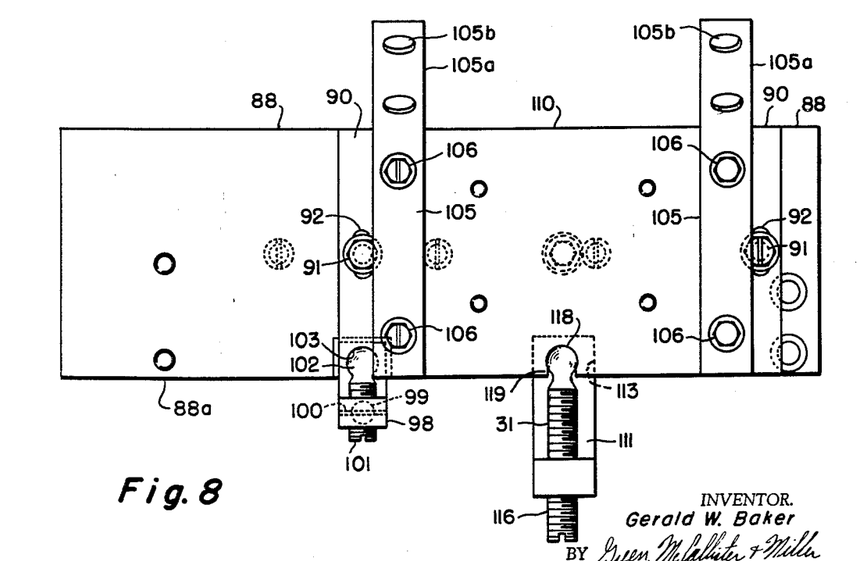
Figure 8 is a plan view of the motor mounting assembly shown in Figure 7.
Figures 9, 10, 11, 12:
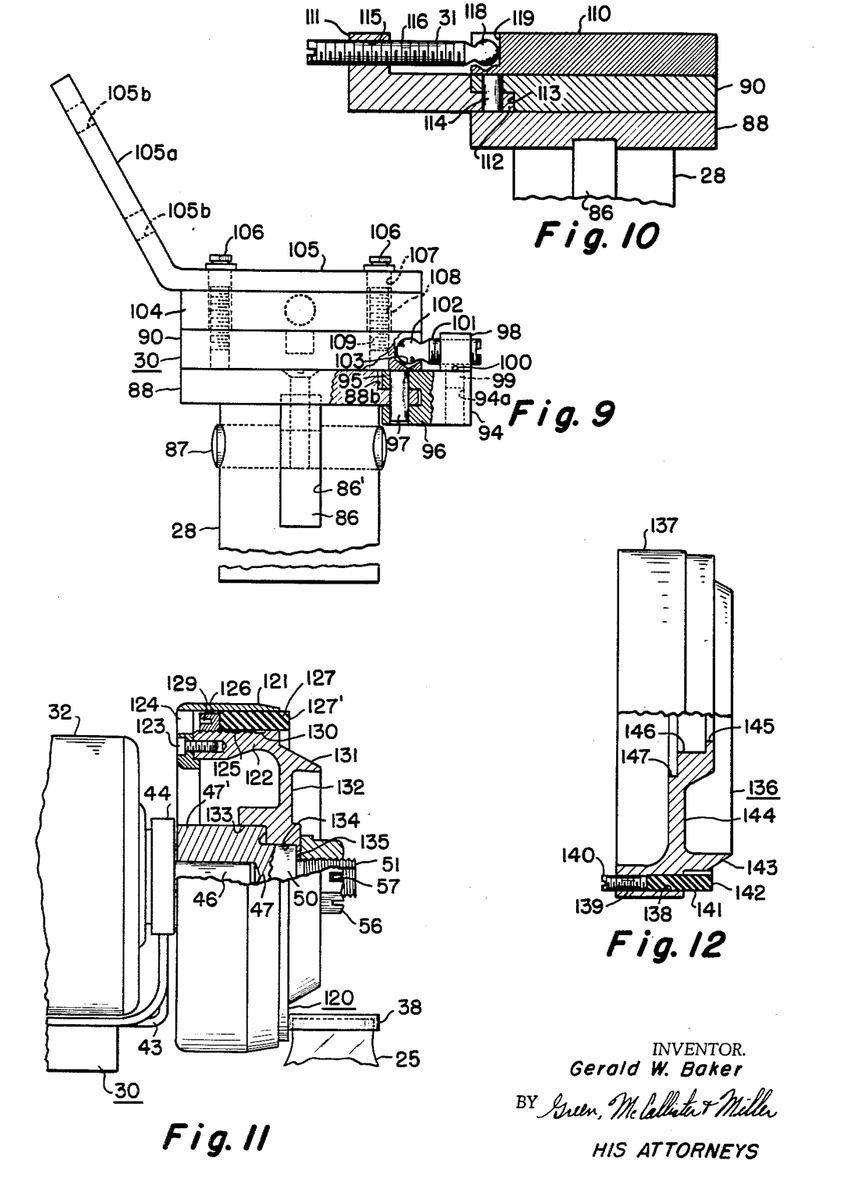
Figure 9 is a side elevational view partly in section of the motor mounting assembly shown in Figure 7.
Figure 10 is a cross-sectional view taken along lines X—X of Figure 7.
Figure 11 is a side elevational view partly in section of another embodiment of the rotating disc assembly.
Figure 12 is a side elevational view partially in section of a further embodiment of a rotating disc assembly showing an alternate construction for mounting a rubber strip.

Means for imparting the arcuate movement to the intermediate member 90 is shown in Figures 8 and 9. A bifurcated bracket 94, having inner bifurcated end portions 95 and 96, is mounted on the base member 88, so that the upper bifurcated end portion 95 fits into the recess 88b formed in the base member 88. A press fit pin 97 locks the bracket 94 to the base member 88 by being frictionally engaged within complementary bores formed in the bifurcated end portions and the base member. An internally-threaded, female bracket 98 is pivotally mounted on the bifurcated bracket 94 by means of a pivot axle 99 that is secured to the female bracket 98 by means of a retaining cross pin 100. The pivot axle 99 rotatively projects into a vertical bore 94a formed within the bracket 94. A ball screw 101 having a spherical, ball-shaped head 102, is threaded within the female bracket 98 for longitudinal adjustment movement therein. The ball head 102 is operably positioned within a recessed chamber 103 formed within a side edge of intermediate member 90. It thus can be seen that when the bolts 91 are loosened, the intermediate member 90 may be adjusted in both an arcuate and transverse manner by adjusting the position of the ball screw 101 within the female bracket 98.

A pair of parallel, longitudinally-extending, side rails 104 are shown positioned (see Figures 7 and 9) on the top of the intermediate member 90, adjacent opposed side edges thereof. A pair of parallel, longitudinally-extending, chute-mounting brackets 105 are mounted on the top portions of the side rails 104 by means of screws 106 which pass through bores 107 and 108 within the chute-mounting brackets 105 and rails 104, respectively, and are threaded into threaded bores 109 formed within intermediate member 90. The chute-mounting brackets 105 have upwardly slanting strap portions 105a that are provided with bolt-receiving hole portions 105b for mounting the collector chute 37 of Figure 1.

A top plate 110 is slidably positioned on top of the intermediate plate 90 and between the parallel longitudinally-extending side rails 104. As noted in Figure 7, the chute-mounting brackets 105 extend outwardly over the top portions of the side rails 104 and help to operably retain the top plate 110 between the side rails 104. As shown particularly in Figures 8 and 10, a ball-headed adjusting screw means 31 is provided for imparting horizontal movement to the top plate 110. An L-shaped bracket 111 having a flange portion 112, is mounted on the adjustable motor-mounting assembly 30, so that the flange portion 112 is positioned within a recess 113 formed within the intermediate member 90. A retaining pin 114 passes through complementary bores within the intermediate plate 90 and the flange portion 112 and secures the bracket 111 to the motor mounting assembly 30. The upper portion of the L-shaped member 111 is provided with a horizontal, internally-threaded bore 115. A ball screw 31 has a ball head 118 operably positioned within a recess portion 119 formed within the top plate 110. The screw 31 is provided with male threads 116 which are cooperatively threaded within internally-threaded bore 115 for longitudinal movement therein. The top plate 110 may be adjustably positioned horizontally-backwardly and forwardly between the side rails 104 by adjusting the position of the screw 31 within the bore 115.

The motor 32 is mounted on the top plate 110 by means of the spring-tensioned retaining clamp 43, and a rotating disc assembly is mounted on the drive shaft of the motor. Therefore, by adjusting the position of the screw 31 within the bore 115, the rotating disc assembly may be accurately positioned over the conveyor 24 to progressively-operably engage cap elements 38 on containers 25, as they are moved thereby by the conveyor 24. In addition, the camber of the rotating disc assembly, including the front operating surface 53a of the rubber disc 53, may be adjusted by adjusting the position of screw 101 within the bracket 98. These two easily made adjustments are important to achieve optimum results. In addition, the screw 31 may be used to move both the motor and the rubber disc to compensate for wearing of the disc.

Another embodiment of my rotating disc assembly is illustrated in Figure 11. This rotating disc assembly 120 comprises an outer rim or band 121 that is secured to a main body drum plate 122 by means of screws 123. A plurality of longitudinally-extending arcuate slots 124 are formed in the base of the outer rim 121. The main body plate 122 is provided with external threads 125 upon which an internally-threaded ring nut 126 is secured. A rubber strip 127 of annular configuration is positioned between the main body plate 122 and the outer rim 121. A series of cross slots 129 are provided in the ring nut 126 for inserting a spider wrench (not shown) to tighten the nut. A thread undercut 130 used to allow thread tool relief is formed within the main body 122 adjacent the rubber strip 127.

The main body plate 122 is provided with a frustro-conical deflecting face 131 to deflect cap elements into the collector chute, and is similar to the face 58 formed in outer plate 55 of rotating disc assembly 34. The forward face of the main body plate 122 is provided with a recessed portion 132. An outer counter-bore 133 and an inner counter-bore 134 are provided concentrically of a center bore 135. The outer counter-bore 133 is adapted to receive an enlarged rearward portion 47' of collar 47, and the inner counter-bore 134 is adapted to receive hub 50, whereas center bore 135 is adapted to receive threaded stub end portion 51 therethrough, so that the rotating disc assembly 120 may be secured in place on the drive shaft 46 of motor 32 when retaining nut 56 is tightened on the threaded portion 51.

One advantage derived from this embodiment is the greater life gained from the rubber abutment strip 127. A further advantage is the saving derived from less waste of rubber, since strips of rubber 127 are used in this embodiment, rather than a rubber disc 53, as used in the rotating disc assembly 34. The rubber strip 127 has an operating or abutment edge surface 127' which may be moved outwardly by tightening ring nut 126 as the surface becomes worn down. The strip 127 is frictionally held in place between outer rim 121 and body plate 122 to prevent slippage. The strips are preferably made of a non-toxic rubber of the silicon variety having a durometer hardness of about 50.

A further embodiment of my rotating disc assembly is illustrated in Figure 12. In this embodiment, the rotating disc assembly 136 comprises a unitary body drum plate 137. The body plate 137 is provided with an annular recess or slot 138 in its forward face adjacent its outer periphery. A plurality of arcuately spaced-apart threaded bores 139 are formed in a rearward face of the body plate 137 and communicate with the bottom of the recess 138. Each threaded bore 139 is provided with an adjustable pressure screw 140 which is adapted to engage an inner edge portion of an annular rubber strip 142 that is frictionally held within the annular recess 138.

By adjusting the pressure screws, the rubber strip 141 may easily be urged outwardly, so that its operating or abutment surface 142 may be aligned to operably engage a closure element 38. A frustro-conical annular deflecting face 143 is formed radially-inwardly of the operating surface 142 and extends axially forwardly thereof, so as to deflect a closure element as it is removed from a container. A recessed portion 144 is formed in the forward face of the body plate 137, radially-inwardly of the annular deflecting face 143. The body plate is provided with counter-bores 147 and 146 and center bore 145, so that the rotating disc assembly may be conveniently mounted on the collar 47 and mounting hub 50 in a like manner to the rotating disc assembly 120. When the operating surface 142 becomes worn and no longer operatively engages a closure element, the pressure screws 140 are threaded inwardly into the bores 139, to urge the rubber strip 141 outwardly. In addition, the pressure screws 140, being arcuately spaced-apart may be selectively threaded into the threaded bores 139 to compensate for uneven wear on the operating surface 142.

My apparatus or machine is mounted on a conveyor support and positioned adjacent a side of the conveyor. A motor 32, such as an electric motor, is mounted on a motor mounting assembly 30 and a rotating disc assembly 34, 120 or 137 is mounted on the drive shaft of the motor. The vertical position of the rotating disc assembly is adjusted by the vertical adjustment screw 33 and the horizontal position and camber of the rotating disc assembly is adjusted by means of ball screws 31 and 101, respectively. Conveyor 24 continuously moves a plurality of containers 25 past the rotating disc assembly. The star wheel assembly 35 which is driven by the pressure of the containers 25 being moved by the conveyor, holds the top cap elements 38 of the containers against the rotating rubber operating surface which contacts the closure elements and removes the closures by spinning them off. A deflector face on the rotating disc assembly directs the closures towards collector chute 37. The air pressure line 41 may be also used to assist in directing the cap elements into the collector chute, if desired. Indicator means, such as the horn 42c may be positioned adjacent the decapping machine to sound a warning if a cap is not completely removed.

As can be seen from the foregoing operational description, my new machine normally operates in a continuous manner dependent upon the speed of the conveyor, rather than in a step-by-step or stop-and-go manner.

Since it is conceivable that the conveyor may occasion a failure and stop with a container in an operable position abutting the rotating disc, I have devised a safety device which may be incorporated with my machine to shut-off the motor 32, should this type of failure occur. The safety device comprises, a micro-switch bracket 18 (Figure 1) that is secured to the under side of base plate 88, a horizontally-slidable arm member 18b adjustably retained within the micro-switch bracket 18, and a pivotal connection 18c normally urging a roller arm 19 outwardly over the conveyor 24. The roller arm 19 is provided with a contact roller 19a of resilient material which contacts each container 25 as it is moved thereby. As the container 25 passes the roller 19a, it urges the roller arm 19 backwardly against tension imparted by the pivotal connection 18c and opens a limit switch LS-1 (Figure 13) to momentarily cut-off power to the motor 32. The roller arm 19 will assume its normal outward position when the container 25 has passed by the roller 19a, thereby closing the limit switch LS-1 and again restoring power to the motor 32. However, should the conveyor 24 stop with a container 25 in an operable abutting relation with the rotating disc assembly 34, the roller 19a and roller arm 19 will be retained in a backward position by the container 25 and therefore the limit switch LS-1 will be retained in an open position, thereby stopping the motor 32, to avoid excessive abrasion to the rotating disc assembly 34 and the top of the container 25.

Figure 13:
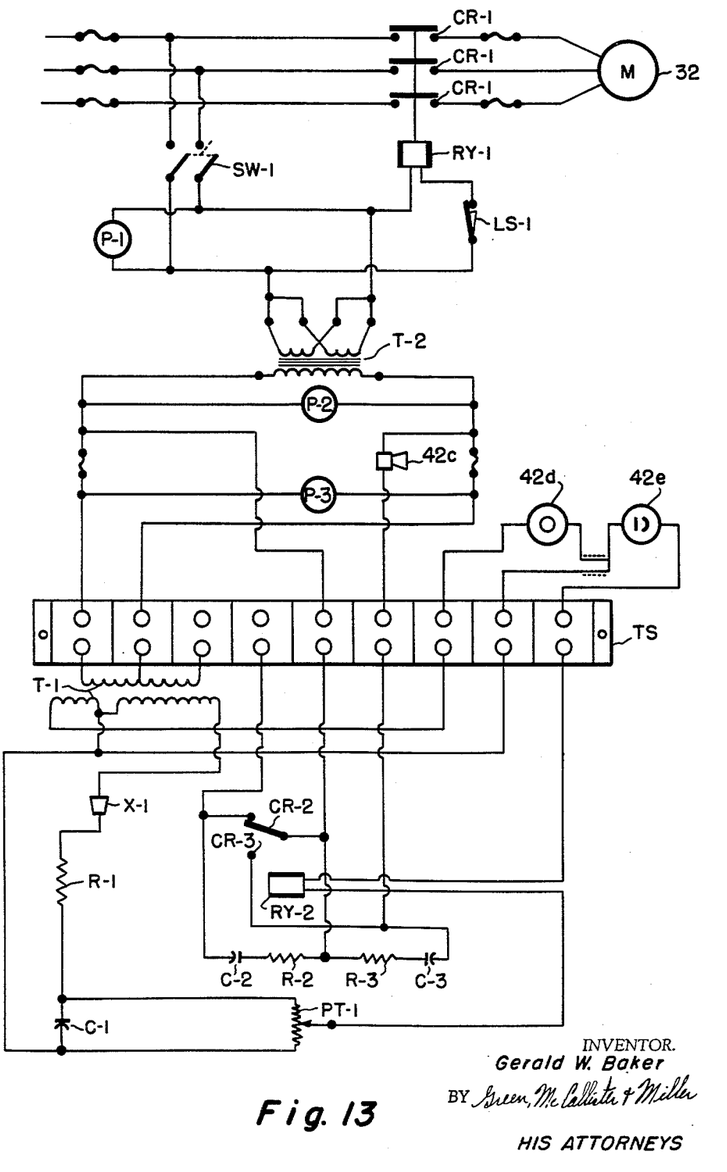
Figure 13 is a schematic wiring diagram illustrating how safety and warning devices incorporated in my apparatus or machine may be automatically operated or controlled.

Figure 13 illustrates the position and operation of the limit switch LS-1 within the electrical circuit. This figure also shows the wiring diagram for the audio signal or horn 42c which is sounded if a closure member is not removed from the container. The horn is activated for a short duration by the closure member interrupting the light beam between the light source 42d and the photo cell 42e.

The three-phase input leads to motor 32 are interrupted by normally-opened contacts CR-1 which are closed when relay RY-1 is energized. The relay RY-1 is in a single phase circuit which is tapped-off the three-phase circuit by means of double pole throw switch SW-1. A control transformer T-2 is connected across this single phase line. A pilot light P-1 is connected in parallel with a transformer T-2 in order to check for power (current flow) on the input line. In addition, the single phase line contains relay RY-1 in series with the normally closed limit switch LS-1.

When power is applied to the three-phase and the switch SW-1 is closed, the normally closed limit switch LS-1 will energize the relay RY-1 to close the normally open contacts CR-1. As a result, power will energize the motor 32 to activate the rotating disc assembly. However, when a container passes by the roller arm 19, the limit switch LS-1 will be momentarily opened, thereby de-energizing the relay RY-1 and opening the contacts CR-1 to momentarily cut-off power to the motor 32. This momentary de-energization of the motor 32 is not of sufficient duration to completely stop the rotating disc assembly, and the inertia of the disc assembly is sufficient to remove the cap element on the container which is in operational contact therewith. However, should the conveyor 24 have a failure and stop with a container 25 in operational engagement with the rotating disc, then the switch LS-1 will be maintained in an open position by the roller arm 19, which will retain the relay RY-1 in a de-energized state and therefore, the contacts CR-1 will remain open and the motor 32 and the rotating disc assembly will come to rest.

P-2 and P-3, shown in Figure 13, are also pilot lights utilized as visual signals to indicate the presence of power within the secondary circuit and for indicating the presence of faulty fuses, respectively. T-1 is a center tap transformer. TS is a terminal strip having nine terminals. R-1, R-2 and R-3 are resistors, and PT-1 is a potentiometer. C-1, C-2 and C-3 are condensers, and X-1 is a rectifier. A relay RY-2 normally retains switch contact CR-2 in a closed position and switch contact CR-3 in an open position. In operation, if a container, whose closure element has not been removed by the rotating disc assembly, passes between the light source 42d and the photo cell 42e, the closure element will interrupt the light beam therebetween, thereby activating the relay RY-2. When so activated, the normally closed switch contact CR-2 is opened and the normally opened switch contact CR-3 is closed, whereby current is permitted to flow through the horn 42c to produce an audible signal and warn the operator of this condition.

Although I have illustrated several embodiments of my invention, I do not limit my invention to those shown and described, as many modifications may be made, within the scope of the appended claims, without departing from the spirit of my invention.

What I claim is:

1. Apparatus for automatically removing closure elements from successively presented sealed containers comprising, rotating disc means, means for momentarily positioning a closure element of each successively presented container in contact with said rotating disc means, a resilient arcuate surface on said rotating disc means for engaging and removing the contacted closure element, and an adjacent frusto-conical surface on said rotating disc assembly for deflecting the removed closure element away from said resilient arcuate surface.

2. Apparatus for automatically removing closure elements from successively presented containers comprising: support means, a horizontally adjustable platform positioned on said support means, a motor mounted on said platform, a rotating disc assembly connectably driven by said motor, means for urging each container toward said rotating disc assembly and for positioning a closure element thereon in operable engagement with the rotating disc assembly for removal of the closure element, an endless conveyor having a support means for continuously transporting the containers past said rotating disc assembly, and said means for urging the containers toward said rotating disc assembly comprising a star wheel assembly resiliently and flexibly mounted on the conveyor support means for relative movement transversely of said conveyor to automatically compensate for variation in sizes and shapes of the containers.

3. Apparatus for automatically removing closure elements from successively presented containers comprising: support means, a horizontally adjustable platform positioned on said support means, a motor mounted on said platform, a rotating disc assembly connectably driven by said motor, means for urging each container toward said rotating disc assembly and for positioning a closure element thereon in operable engagement with the rotating disc assembly for removal of the closure element, and said rotating disc assembly comprising an annular resilient contacting portion having an operating surface for frictionally engaging a closure element, and a frusto-conical deflecting face positioned radially-inwardly of said operating surface to deflect a removed closure element outwardly away therefrom.

4. Apparatus for automatically removing closure elements from successively presented containers comprising: support means, a horizontally adjustable plaform positioned on said support means, a motor mounted on said platform, a rotating disc assembly connectably driven by said motor, means for urging each container toward said rotating disc assembly and for positioning a closure element thereon in operable engagement with the rotating disc assembly for removal of the closure element; said horizontally-adjustable platform comprising: a base member secured to the top of said support means, an intermediate member adjustably secured to the base member, means for transversely and arcuately positioning said intermediate member, a top plate for mounting the motor and slidably maintained on said intermediate plate, and means for adjustably positioning the top plate forwardly and backwardly with respect to the intermediate plate to thereby adjustably position the rotating disc assembly, so as to operatively engage closure elements on the continuously moving containers as they are moved past the rotating disc assembly.

5. A machine for continuously removing temporary closure elements positioned on a plurality of containers continuously moving past the machine on a supported conveyor comprising, support means secured to the conveyor support, a vertically-adjustable upright member secured to said support means, means for adjusting the vertical position of said upright member with respect to said support means, a horizontally-adjustable platform secured to the top of said upright member, a motor positioned on said horizontally-adjustable platform, a rotating disc assembly connected to the drive shaft of said motor, an annular operating surface on said rotating disc assembly for contacting closure elements on the containers as they pass thereby, means for urging the closure element on each container into an operable engagement with said operating surface to form a frictional engagement therebetween for removing the closure element, means for deflecting a removed closure element into a collecting chute, said horizontally-adjustable platform having means for adjusting the camber and transverse positioning of the operating surface with respect to the travel of the containers along the conveyor, and the vertically-adjustable means for said upright member positioning the vertical position of the operating surface with respect to the closure elements.

6. A machine for continuously removing temporary closure elements positioned on a plurality of containers continuously moving past the machine on a supported conveyor comprising, support means secured to the conveyor support, a vertically-adjustable upright member secured to said support means, means for adjusting the vertical position of said upright member with respect to said support means, a horizontally-adjustable platform secured to the top of said upright member, a motor positioned on said horizontally-adjustable platform, a rotating disc assembly connected to the drive shaft of said motor, an annular operating surface on said rotating disc assembly for contacting closure elements on the containers as they pass thereby, means for urging the closure element on each container into an operable engagement with said operating surface to form a frictional engagement therebetween for removing the closure element, means for deflecting a removed closure element into a collecting chute; said rotating disc assembly comprising an annular back disc, a resilient contact disc of greater diameter than said back disc and having a forward operating surface, and an outer disc-shaped plate of smaller diameter than said back disc having a frusto-conical deflecting surface adjacent the operating surface of said contact disc to deflect removed closure elements away therefrom.

7. A machine for continuously removing temporary closure elements positioned on a plurality of containers continuously moving past the machine on a supported conveyor comprising, support means secured to the conveyor support, a vertically-adjustable upright member secured to said support means, means for adjusting the vertical position of said upright member with respect to said support means, a horizontally-adjustable platform secured to the top of said upright member, a motor positioned on said horizontally-adjustable platform, a rotating disc assembly connected to the drive shaft of said motor, an annular operating surface on said rotating disc assembly for contacting closure elements on the containers as they pass thereby, means for urging the closure element on each container into an operable engagement with said operating surface to form a frictional engagement therebetween for removing the closure element, means for deflecting a removed closure element into a collecting chute; said rotating disc assembly comprising: an annular main body plate, an outer rim secured to said main body plate, an annular recess formed between said outer rim and said main body plate, a ring nut threaded within said annular recess, a resilient rubber strip frictionally retained within said recess forwardly of said ring nut and having a forward operating surface, a plurality of longitudinally-extending slots formed in a base portion of said outer rim for inserting a spider wrench therethrough to rotate said ring nut and thereby urge said resilient strip forwardly to compensate for wear on the operating surface, and said main body plate having a frusto-conical forwardly-projecting deflecting surface radially-inwardly of said operating surface to deflect removed closure elements away from said rotating disc assembly.

8. A machine for continuously removing temporary closure elements positioned on a plurality of containers continuously moving past the machine on a supported conveyor comprising, support means secured to the conveyor support, a vertically-adjustable upright member secured to said support means, means for adjusting the vertical position of said upright member with respect to said support means, a horizontally-adjustable platform secured to the top of said upright member, a motor positioned on said horizontally-adjustable platform, a rotating disc assembly connected to the drive shaft of said motor, an annular operating surface on said rotating disc assembly for contacting closure elements on the containers as they pass thereby, means for urging the closure element on each container into an operable engagement with said operating surface to form a frictional engagement therebetween for removing the closure element, means for deflecting a removed closure element into a collecting chute; said rotating disc assembly comprising: an annular unitary body plate, an annular recess formed in the forward face of said body plate adjacent its outer periphery, a plurality of arcuately-spaced-apart threaded bores formed in a rear face of said body plate and communicating with the bottom of said annular recess, a rubber strip frictionally retained within said annular recess and having a forward operating surface, an adjustable pressure screw positioned within each threaded bore to operatively engage a bottom portion of said rubber strip and urge it forwardly to compensate for wear on the operating surface, and an annular deflecting face extending axially-forwardly and radially-inwardly of the operating surface for deflecting a closure member as it is removed from a container.

9. Apparatus for automatically removing closure elements from a plurality of containers as they are transported on a conveyor which comprises, support means adjacent said conveyor, a horizontally-adjustable platform secured to said support means, means for vertically-adjusting said horizontally-adjustable platform, a motor mounted on said horizontally-adjustable platform, a rotating disc assembly operatively connected to the drive shaft of said motor, an operating surface on said rotating disc assembly for frictionally engaging and removing a closure element on each container as they pass thereby, collecting means for collecting removed closure elements, means for deflecting removed closure elements toward and into said collecting means, a star wheel assembly resiliently mounted adjacent the conveyor for urging the closure element on each container into an operative relation with the operating surface of the rotating disc assembly as the container is transported thereby on the conveyor, a photo electric cell, a light source directs a light beam to said photo electric cell that is interrupted by the presence of a closure element retained on a container after the container has passed the rotating disc assembly, an electric relay and an electric sound device, an electric circuit connecting said cell to said relay, a switch contact, and an electric circuit connecting said relay through said switch contact to said sound device, all in such a manner that an interruption of the light beam will cause said cell to energize said relay to close said switch contact and energize said sound device.

10. Apparatus for automatically removing closure elements from a plurality of containers as they are transported on a conveyor which comprises, support means adjacent said conveyor, a horizontally-adjustable platform secured to said support means, means for vertically-adjusting said horizontally-adjustable platform, a motor mounted on said horizontally-adjustable platform, a rotating disc assembly operatively connected to the drive shaft of said motor, an operating surface on said rotating disc assembly for frictionally engaging and removing a closure element on each container as they pass thereby, collecting means for collecting removed closure elements, means for deflecting removed closure elements toward and into said collecting means, a star wheel assembly resiliently mounted adjacent the conveyor for urging the closure element on each container into an operative relation with the operating surface of the rotating disc assembly as the container is transported thereby on the conveyor, said star wheel assembly comprising: a horizontal bracket secured adjacent said conveyor, a normally vertically-disposed axle housing hinged to said horizontal bracket, a plurality of spring leaves resiliently urging said axle housing into a vertical position, a spindle rotatably mounted on said axle housing, a plurality of vertically-disposed star wheels secured to said spindle above said axle housing, a plurality of resilient fingers secured to each arcuate face of the star wheels to provide a cushioned contact with the side of each of the containers as they are conveyed thereby, and said spring leaves providing a flexible outward deflection of the spindle and axle housing to accommodate for variations in container walls.

11. Apparatus for automatically removing closure elements from a plurality of containers as they are transported on a conveyor which comprises, support means adjacent said conveyor, a horizontally-adjustable platform secured to said support means, means for vertically-adjusting said horizontally-adjustable platform, a motor mounted on said horizontally-adjustable platform, a rotating disc assembly operatively connected to the drive shaft of said motor, an operating surface on said rotating disc assembly for frictionally engaging and removing a closure element on each container as they pass thereby, collecting means for collecting removed closure elements, means for deflecting removed closure elements toward and into said collecting means, a star wheel assembly resiliently mounted adjacent the conveyor for urging the closure element on each container into an operative relation with the operating surface of the rotating disc assembly as the container is transported thereby on the conveyor, and safety means for de-energizing the motor and accordingly stopping the rotating disc assembly when the conveyor stops with a container in operable engagement with the rotating disc assembly.

12. Apparatus for automatically removing closure elements from a plurality of containers as they are transported on a conveyor which comprises, support means adjacent said conveyor, a horizontally-adjustable platform secured to said support means, means for vertically-adjusting said horizontally-adjustable platform, a motor mounted on said horizontally-adjustable platform, a rotating disc assembly operatively connected to the drive shaft of said motor, an operating surface on said rotating disc assembly for frictionally engaging and removing a closure element on each container as they pass thereby, collecting means for collecting removed closure elements, means for deflecting removed closure elements toward and into said collecting means, a star wheel assembly resiliently mounted adjacent the conveyor for urging the closure element on each container into an operative relation with the operating surface of the rotating disc assembly as the container is transported thereby on the conveyor, safety means for de-energizing the motor and accordingly stopping the rotating disc assembly when the conveyor stops with a container in operable engagement with the rotating disc assembly, said safety means comprising, a roller arm assembly normally urged outwardly over the conveyor, a normally closed limit switch operatively connected to said roller arm assembly, said roller arm being urged inwardly by contact with a passing container to open said normally closed limit switch, and a relay de-energized by the opening of said limit switch to open a power supply circuit leading to said motor.

13. Apparatus as defined in claim 3 wherein, the successively presented containers are continuously transported linearly past the rotating disc assembly on an endless conveyor mounted on a conveyor support; and said support means comprises: a horizontal bracket secured to a lower portion of the conveyor support, a horizontal guide member secured to an upper portion of the conveyor support, and a vertically adjustable upright tubular member adjustably retained by said horizontal support bracket and slidably guided by said horizontal guide member, wherein the vertical position of said horizontally-adjustable platform and accordingly the rotating disc assembly, may be accurately adjusted.

14. A machine for continuously removing temporary closure elements positioned on a plurality of containers continuously moving past the machine on a supported conveyor comprising, support means secured to the conveyor support, a vertically adjustable upright member secured to said support means, means for adjusting the vertical position of said upright member with respect to said support means, a horizontally-adjustable platform secured to the top of said upright member, a motor positioned on said horizontally-adjustable platform, a rotating disc assembly connected to the drive shaft of said motor, an annular operating surface on said rotating disc assembly for frictionally contacting and removing closure elements on the containers as they pass thereby, means for urging the closure element on each container into an operable engagement with said operating surface to form a frictional engagement therebetween for facilitating the removal of the closure element, and frusto-conical deflecting means on said rotating disc assembly for deflecting a removed closure element into a collecting chute.

15. Apparatus as defined in claim 14 wherein, said means for urging a closure member into operable engagement with said operating surface comprises a star wheel assembly, said star wheel assembly being flexibly and resiliently secured to a side of the conveyor support opposite the upright member for transverse movement away from the conveyor to compensate for variations in size and shape of said containers, and resilient fingers are positioned on operating surfaces of said star wheel assembly to gently grip the containers.

16. Apparatus for automatically removing closure elements from a plurality of containers as they are transported on a conveyor which comprises, support means adjacent said conveyor, a horizontally-adjustable platform secured to said support means, means for vertically-adjusting said horizontally-adjustable platform, a motor mounted on said horizontally-adjustable platform, a vertically positioned rotating disc assembly operatively connected to a horizontal drive shaft of said motor, an operating surface on said rotating disc assembly for frictionally engaging and removing a closure element on each container as they pass thereby, collecting means for collecting removed closure elements, frusto-conical deflecting means on said rotating disc assembly for deflecting removed closure elements toward and into said collecting means, a star wheel assembly mounted adjacent the conveyor for urging the closure element on each container into an operative relation with the operating surface of the rotating disc assembly as the container is transported thereby on the conveyor, and means on said star wheel assembly for automatically compensating for variations in the width of the containers.

17. Apparatus as defined in claim 16 wherein an alarm system is provided adjacent said horizontally-adjustable platform, and said alarm system has means for activating an audio signal when a container passes the rotating disc assembly without its closure element being removed.

18. A method of removing closure elements from a plurality of containers comprising the steps of continuously moving the containers along a conveyor, rotating a disc in a substantially vertical plane adjacent the conveyor, urging each container against the rotated disc, spinning off a closure element therefrom, deflecting-directing the spun-off closure element toward a chute, and collecting the removed closure element.

19. Apparatus for automatically removing closure elements from successively presented sealed containers comprising, rotating disc means, a star wheel assembly positioned transversely across from said rotating disc means for momentarily positioning a closure element of each successively presented container in contact with said rotating disc means, resilient means mounting said star wheel assembly for deflection away from said rotating disc means to automatically compensate for variations in the container bodies, and said rotating disc means having an arcuate surface for removing the contacted closure element and an adjacent inclined surface for deflecting the removed closure element away from said arcuate surface.

References Cited in the file of this patent

UNITED STATES PATENTS

| | | |
|---|---|---|
| 1,748,961 | Risser | Mar. 4, 1930 |
| 2,026,118 | Barnby | Dec. 31, 1935 |
| 2,650,748 | Bennett | Sept. 1, 1953 |
| 2,782,897 | Filander | Feb. 26, 1957 |